United States Patent [19]

Ukyo et al.

[11] Patent Number: 5,120,682
[45] Date of Patent: Jun. 9, 1992

[54] SINTERED BODY OF SILICON NITRIDE

[75] Inventors: Yoshio Ukyo; Shigetaka Wada, both of Aichi, Japan

[73] Assignee: Kabushiki Kaisha Toyota Chuo Kenkyusho, Aichi, Japan

[21] Appl. No.: 631,949

[22] Filed: Dec. 21, 1990

[30] Foreign Application Priority Data

Dec. 28, 1989 [JP] Japan .................................. 1-340864

[51] Int. Cl.$^5$ ............................................. C04B 35/58
[52] U.S. Cl. ....................................... 501/96; 501/97; 501/98
[58] Field of Search ....................... 501/98, 87, 89, 92, 501/97, 96

[56] References Cited

U.S. PATENT DOCUMENTS

| 4,506,020 | 3/1985 | Butler et al. | 501/98 |
| 4,547,470 | 10/1985 | Tanase et al. | 501/87 |
| 4,711,644 | 12/1987 | Yeckley et al. | 501/97 |
| 4,818,635 | 4/1989 | Ekström et al. | 501/98 |
| 4,978,645 | 12/1990 | Ukyo et al. | 501/98 |

FOREIGN PATENT DOCUMENTS 3-5369 11/1991 Japan .

Primary Examiner—Karl Group
Assistant Examiner—Deborah Jones
Attorney, Agent, or Firm—Oblon, Spivak, McClelland, Maier & Neustadt

[57] ABSTRACT

A sintered body of silicon nitride composed of $\alpha'$-$Si_3N_4$ and $\beta'$-$Si_3N_4$, the former being represented by the formula $Y_x(Si,Al)_{12}(O,N)_{16}$ (where the value of x, which denotes the amount of occluded Y, is in the range of $0<x<0.3$), with the value of x for $\alpha'$-$Si_3N_4$ in the outer part of the sintered body being greater than for $\alpha'$-$Si_3N_4$ in the inner part of the sintered body. The sintered body will find use as high-temperature structural material owing to its high strength and high toughness.

14 Claims, No Drawings

SINTERED BODY OF SILICON NITRIDE

BACKGROUND OF THE INVENTION

1. Field of the Invention

The present invention relates to a sintered body of silicon nitride suitable for use as a high-temperature structural material owing to its high strength and high toughness.

2. Description of the Prior Art

A sintered body of silicon nitride ($Si_3N_4$) has been used as a heat-resistant structural material such as gas turbine parts, heat exchanger material, high-temperature bearings, and high-temperature rolls for steel making, owing to its outstanding high-temperature strength, thermal shock resistance, and corrosion resistance.

A disadvantage of silicon nitride is that it needs a sintering aid, which is usually an oxide such as MgO, $MgAl_2O_4$, $Al_2O_3$, and $Y_2O_3$, because it involves difficulties when it is sintered alone. It is considered that the sintering aid brings about liquid-phase sintering through the medium of a liquid phase which forms during sintering. After sintering, the liquid phase remains as a glass phase in the sintered body, impairing the high-temperature characteristics such as strength and creep resistance.

Silicon nitride can occlude a variety of elements to yield a material generally called sialon. It is regarded as a future high-temperature structural material owing to its high-temperature characteristics. There are two types of sialon: $\alpha$-sialon (or $\alpha'$-$Si_3N_4$) and $\beta$-sialon (or $\beta'$-$Si_3N_4$). $\alpha$-sialon has the $\alpha$-$Si_3N_4$ structure and is represented by the formula $M_x(Si,Al)_{12}(O,N)_{16}$ (where $0<x \leq 2$, and M denotes at least one member selected from metallic elements, such as Li, Mg, Ca, and Y). It has Al and O substituted at the Si position and N position, respectively, and it also has other elements (such as Li, Mg, Ca, and Y) penetrated to the interlattice position. $\beta$-Sialon has the $\beta$-$Si_3N_4$ structure and is represented by the formula $Si_{6-y}Al_yO_yN_{8-y}$ (where $0<y \leq 4.2$). It has Al and O substituted at the Si position and N position, respectively.

Unfortunately, sialon composed of $\alpha'$-$Si_3N_4$ alone or $\beta'$-$Si_3N_4$ alone is inferior to a sintered body of silicon nitride in strength at room temperature and toughness. To eliminate this disadvantage, there have been developed sintered bodies composed of $\alpha'$-$Si_3N_4$ and $\beta'$-$Si_3N_4$ as mentioned below.

It is reported in *J. Materials Sci.* 14 (1979 p. 1749 that it is possible to obtain a sintered body based on a single phase of $\alpha'$-$Si_3N_4$ or a mixed phase of $\alpha'$-$Si_3N_4$ and $\beta'$-$Si_3N_4$ by sintering a mixture of $Si_3N_4$, $Y_2O_3$, and AlN powders. Also, it is reported in Japanese Patent Laid-open No. 185484/1983 that a sintered body based on a mixed phase of $\alpha'$-$Si_3N_4$ and $\beta'$-$Si_3N_4$ is obtained from $\alpha'$-$Si_3N_4$ and $\beta'$-$Si_3N_4$ powders. Unfortunately, these two sintered bodies are still poor in strength at both room temperature and high temperatures.

In addition, it is reported in Japanese Patent Laid-open No. 182276/1984 that a sintered body composed of $\alpha'$-$Si_3N_4$ and $\beta'$-$Si_3N_4$ is obtained by sintering a mixture of $Si_3N_4$, $Y_2O_3$, AlN, and $Al_2O_3$ powders. This sintered body is claimed to have an improved strength at high temperatures, if it contains $\alpha'$-$Si_3N_4$ in a ratio of 0.05–0.7 and it also contains crystal grains having a diameter smaller than 40 $\mu$m in the major axis.

SUMMARY OF THE INVENTION

The present invention was completed to overcome the disadvantages involved in the prior art technology. Accordingly, it is an object of the present invention to provide a sintered body of silicon nitride having high strength and high toughness.

The gist of the present invention resides in a sintered body of silicon nitride which comprises $\alpha'$-$Si_3N_4$ represented by the formula $Y_x(Si,Al)_{12}(O,N)_{16}$ and $\beta'$-$Si_3N_4$ represented by the formula $Si_{6-z}Al_zO_zN_{8-z}$ (where $0<z \leq 4.2$), said $\alpha'$-$Si_3N_4$ having a value of x in the range of $0<x<0.3$, with the value of x for $\alpha'$-$Si_3N_4$ present in the outer part of the sintered body being greater than that for $\alpha'$-$Si_3N_4$ present in the inner part of the sintered body.

The sintered body of silicon nitride pertaining to the present invention has high strength and high toughness. It is considered that these outstanding properties are attributable to the following. The sintered body of silicon nitride contains Y occluded in $\alpha'$-$Si_3N_4$, with the amount of Y being greater in the outer part of the sintered body than in the inner part of the sintered body. Therefore, the sintered body has a thermal expansion coefficient which is smaller in the outer part than in the inner part. This causes a compressive stress to occur in the outer part of the sintered body, which leads to an increased strength. Moreover, the amount of Y occluded in $\alpha'$-$Si_3N_4$ is small. (Note that the value of x is in the range of $0<x<0.3$ in $Y_x(Si,Al)_{12}(O,N)_{16}$.) This reduces the relative amount of glass phase in the grain boundary, which leads to high strength at high temperatures. The same holds for high toughness.

The above and other objects, features and advantages of the present invention will become more apparent from the following description when taken in conjunction with the accompanying drawings in which a preferred embodiment of the invention is shown by way of illustrative example.

DESCRIPTION OF THE PREFERRED EMBODIMENTS

According to the present invention, the sintered body of silicon nitride ($Si_3N_4$) is composed of two phases, one being $\alpha'$-$Si_3N_4$ and the other being $\beta'$-$Si_2N_4$. The $\alpha'$-$Si_3N_4$ is represented by the formula $Y_x(Si,Al)_{12},(O,N)_{16}$, with the value of x being in the range of $0<x<0.3$. The value of x for $\alpha'$-$Si_3N_4$ present in the outer part of the sintered body is greater than that for $\alpha'$-$Si_3N_4$ present in the inner part of the sintered body.

The term "$\alpha'$-$Si_3N_4$" as used herein denotes a compound represented by the formula $Y_x(Si,Al)_{12}(O,N)_{16}$ with the $\alpha$-$Si_3N_4$ structure. It has Al and O substituted at the Si position and N position, respectively, and it also has yttrium (Y) penetrated to the interlattice position. It is called $\alpha$-sialon.

Likewise, the term "$\beta'$-$Si_3N_4$" as used herein denotes a compound represented by the formula $Si_{6-z}Al_2O_2N_{8-z}$ (where $0<z \leq 4.2$). It has Al and O substituted at the Si position and N position, respectively. It is called $\beta$-sialon.

In the above formula $Y_x(Si,Al)_{12}(O,N)_{16}$ for $\alpha'$-$Si_3N_4$, the value of x should be in the range of $0<x<0.3$. This is a requirement for the sintered body containing a less amount of glass phase in the grain boundary and hence having an increased strength at high temperatures.

In the above formula $Si_{6-z}Al_zO_zN_{8-z}$, for $\beta'$-$Si_3N_4$, the value of z should preferably be in the range of $0<z$ ≦1.0. This is another requirement for the sintered body containing a less amount of glass phase in the grain boundary and hence having an increased strength at high temperatures.

The sintered body of silicon nitride pertaining to the present invention has a thermal expansion coefficient which is inversely proportional to the amount of Y occluded, or the value of x within the range of $0 < x < 0.3$ in the above formula for $\alpha'$-$Si_3N_4$. According to the present invention, the amount of Y occluded in $\alpha'$-$Si_3N_4$ is greater in the outer part of the sintered body than in the inner part of the sintered body. It follows, therefore, that the sintered body has a thermal expansion coefficient which is greater in the inner part than in the outer part. This causes a compressive stress to occur in the outer surface, which leads to an improvement of the sintered body in strength.

It is desirable that the value of x in the formula for $\alpha'$-$Si_3N_4$ in the inner part should be smaller by more than 0.05 than that in the formula for $\alpha'$-$Si_3N_4$ in the outer part. If the difference is smaller than 0.05, the sintered body will have a thermal expansion coefficient which does not vary greatly between the outer part and the inner part, with the result that the sintered body is not so improved in strength.

The state in which the value of x is greater in the outer part than in the inner part may exist in three types. (1) The value of x in the outer part is different from that in the inner part. (In this case, the sintered body has a separately formed surface layer.) (2) The value of x continuously changes from the inner part to the outer part. (3) The value of x in the outer part is different from that in the inner part; but the difference is divided into two by placing an intermediate layer having an intermediate value of x. Except the second case, the surface layer (including the intermediate layer) should be 200-500 μm thick.

According to the present invention, the sintered body should be composed of $\alpha'$-$Si_3N_4$ and $\beta'$-$Si_3N_4$ whose ratio is from 0.05:0.95 to 0.50:0.50. If the amount of $\alpha'$-$Si_3N_4$ is smaller or larger than specified above, the sintered body will not have the desired toughness and strength. The preferred ratio of $\alpha'$-$Si_3N_4$ to $\beta'$-$Si_3N_4$ is from 0.07:0.93 to 0.35:0.65. The ratio is calculated from intensity of X-ray diffraction peaks, that is, by comparing the sum of the highest intensity and the second highest intensity of peaks of $\alpha'$-$Si_3N_4$ with that of $\beta'$-$Si_3N_4$.

The $\alpha'$-$Si_3N_4$ should preferably be composed of crystal grains whose average diameter is not larger than 2.0 μm. The $\beta'$-$Si_3N_4$ should preferably be composed of crystal grains whose average diameter is not larger than 5.0 μm in the major axis and not larger than 1.0 μm in the minor axis. If either or both of the $\alpha'$-$Si_3N_4$ and $\beta'$-$Si_3N_4$ are composed of crystal grains larger than specified above, the resulting sintered body does not have the desired strength. For the sintered body to have the maximum strength, it is necessary that the $\alpha'$-$Si_3N_4$ be composed of crystal grains whose average diameter is not larger than 1.0 μm and the $\beta'$-$Si_3N_4$ be composed of crystal grains whose average diameter is not larger than 2.5 μm in the major axis and not larger than 5.0 μm in the minor axis. The diameter in the major axis should be greater than twice that in the minor axis. Otherwise, the crystal grains have nearly equal diameters in the major and minor axes and hence the resulting sintered body has low strength and toughness.

The sintered body of silicon nitride pertaining to the present invention may be produced by coating a previously prepared molded article with a surface layer. This process consists of a first step of preparing a molded article from a raw material to be made into a sintered body composed of $\alpha'$-$Si_3N_4$ and $\beta'$-$Si_3N_4$, and a second step of coating the molded article with a second raw material to be made into a sintered body composed of $\alpha'$-$Si_3N_4$ and $\beta'$-$Si_3N_4$, and sintering the molded article with a coating layer. The second raw material used in the second step forms the surface layer of the sintered body. Therefore, the second raw material affords $\alpha'$-$Si_3N_4$ having a higher value of x (defined by the above formula), whereas the first raw material affords $\alpha'$-$Si_3N_4$ having a lower value of x (defined by the above formula).

The raw materials used in the first and second steps are composed of two components, one forming $\alpha'$-$Si_3N_4$ upon sintering, the other forming $\beta'$-$Si_3N_4$ upon sintering. The first component is either $\alpha'$-$Si_3N_4$ per se or a mixture which forms $\alpha'$-$Si_3N_4$ due to the reaction that takes place during heating and sintering. They may be used alone or in combination. Examples of the mixture include $Si_3N_4$-$AlN$-$Y_2O_3$, $Si_3N_4$-$AlN$-$Al_2O_3$-$Y_2O_3$, and $Si_3N_4$-$Al_2O_3$-$Y_2O_3$-$YN$, which form $\alpha'$-$Si_3N_4$ containing occluded Y. The second component is either $\beta'$-$Si_3N_4$, per se or a mixture which forms $\beta'$-$Si_3N_4$ due to the reaction that takes place during heating and sintering. They may be used alone or in combination. Examples of the mixture include $Si_3N_4$-$Al_2O_3$, $Si_3N_4$-$AlN$-$Al_2O_3$, and $Si_3N_4$-$Al_2O_3$-$SiO_2$.

The mixture which forms $\alpha'$-$Si_3N$. due to the reaction that takes place during heating and sintering may be modified so that it forms both $\alpha'$-$Si_3N_4$ and $\beta'$-$Si_3N_4$ simultaneously. This is accomplished by adjusting the ratio of $Si_3N_4$ to $AlN$-$Y_2O_3$, $AlN$-$Al_2O_3$-$Y_2O_3$, or $Al_2O_3$-$YN$, if the raw material is to form $\alpha'$-$Si_3N_4$ containing occluded Y and $\beta'$-$Si_3N_4$ simultaneously. This is because silicon nitride occludes Y, Al, and O to form $\alpha'$-$Si_3N_4$ and also occludes Al and O to form $\beta'$-$Si_3N_4$. The same mixture will form $\alpha'$-$Si_3N_4$ and $\beta'$-$Si_3N_4$ in a different ratio depending on the sintering temperature and time. In other words, it is possible to establish a desired ratio by controlling the sintering conditions.

The raw material can also be a powder having a broad particle size distribution or a mixed powder composed of more than one kind of $\alpha'$-$Si_3N_4$ powder and more than one kind of $\beta'$-$Si_3N_4$ powder, both of which form $\alpha'$-$Si_3N_4$ and $\beta'$-$Si_3N_4$ upon sintering, each composed of more than one component (that is, each of x and z in the above formulas has more than one value).

In the first step, the above-mentioned raw material is made into a molded article by die pressing, rubber pressing, extrusion, slip casting, or injection molding. In the second step, the molded article (or inner body) formed in the first step is coated with the above-mentioned raw material, and the coated body is sintered. The raw material for coating should be composed such that it forms $\alpha'$-$Si_3N_4$ having a higher value of x (defined by the above formula) than that of $\alpha'$-$Si_3N_4$ in the inner body. Alternatively, the raw material for coating may be one which form $\alpha'$-$Si_3N_4$ alone upon sintering.

The raw material for coating may be applied to the inner body by dipping (in slip), spraying, or electrodeposition. Alternatively, the coating may be accomplished by placing the inner body in the powder of the raw material for coating.

The above-mentioned coating may be accomplished in several steps with raw material powders which differ from one another in the value of x in the formula for $\alpha'$-Si$_3$N$_4$. In this way, it is possible to produce a sintered body in which the value of x for $\alpha'$-Si$_3$N$_4$ varies continuously or stepwise across the thickness of the surface layer.

Sintering in the second step may be either sintering under pressure or pressureless sintering, and may be gas pressure sintering, hot isostatic pressure (HIP) sintering, etc. The sintering is preferably performed in an atmosphere of inert gas (such as nitrogen and argon) or in a non-oxidizing atmosphere (such as vacuum). The sintering temperature should preferably be in the range of 1650°–1900° C. At a temperature below 1650° C., sintering does not achieve sufficient densification. At a temperature above 1900° C., sintering gives rise to excessively grown crystal grains which have an adverse effect on strength.

A proper mixing ratio should be established between the raw material which forms $\alpha'$-Si$_3$N$_4$ upon firing and the raw material which forms $\beta'$-Si$_3$N$_4$ upon firing, and also a proper sintering condition should be established for them so that the resulting sintered body contains $\alpha'$-Si$_3$N$_4$ and $\beta'$-Si$_3$N$_4$ in a desired ratio, has crystal grains of desired diameter, and has the composition as specified above.

The sintered body of silicon nitride pertaining to the present invention may be incorporated, according to its application, with a variety of heat-resistant substances such as oxides, nitrides, carbides, silicides, borides, and sulfides. It may also contain the sintering aid used in the manufacturing process.

The sintered body of silicon nitride pertaining to the present invention will find use as high-temperature machine parts, chemical plant parts, wear-resistant materials (such as bearings), gas turbine parts, and heat exchanger parts, owing to the above-mentioned characteristic properties.

The invention will be described with reference to the following examples.

A raw material (powder mixture) was prepared from the following powders.

Si$_3$N$_4$ powder (ave. particle dia.=0.5 μm)
AlN powder (ave. particle dia.=0.7 μm)
Y$_2$O$_3$ powder (ave. particle dia.=0.7 μm)
$\alpha'$-Si$_3$N$_4$ (ave. particle dia.=0.5 μm)
$\beta'$-Si$_3$N$_4$ (ave. particle dia.=0.5 μm)

In order that the resulting sintered body is composed of $\alpha'$-Si$_3$N$_4$ and $\beta'$-Si$_3$N$_4$ in a desired ratio, each of which contains the occluded elements in specific amounts, a first material was prepared from the powders in a proper ratio. The raw material was molded into an inner body. The inner body was coated with a second raw material which is composed of the powders in such a ratio that it forms $\alpha'$-Si$_3$N$_4$ containing more occluded Y than $\alpha'$-Si$_3$N$_4$ in the inner body. Sintering was performed in nitrogen at 1600°–1900° C. for 1–10 hours. Thus there was obtained a sintered body of silicon nitride composed of an inner part and an outer part which differ from each other in the amount of occluded Y in $\alpha'$-Si$_3$N$_4$.

For the purpose of comparison, a sintered body was prepared in the same manner as above except that the inner part and outer part are the same in the amount of occluded Y in $\alpha'$-Si$_3$N$_4$.

The resulting sintered bodies were tested for four-point bending strength (at room temperature) and toughness ($K_{IC}$ value by indentation fracture method). The results are shown in Table 1. In Table 1, the ratio between the amount of $\alpha'$-Si$_3$N$_4$ in the inner part and the amount of $\alpha'$-Si$_3$N$_4$ in the outer part was measured as follows: First, the outer part was examined by X-ray diffraction method for the ratio between the amount of $\alpha'$-Si$_3$N$_4$ and the amount of $\beta'$-Si$_3$N$_4$. Second, the outer part (tens of micrometers thick) was ground off. Third, the inner part was examined again by X-ray diffraction method for the ratio between the amount of $\alpha'$-Si$_3$N$_4$ and the amount of $\beta'$-Si$_3$N$_4$. The ratio was calculated by comparing the sum of the highest and second highest peaks for $\alpha'$-Si$_3$N$_4$ with the sum of the highest and second highest peaks for $\beta'$-Si$_3$N$_4$ in the X-ray diffraction chart. In Table 1, "ratio of $\alpha'$-Si$_3$N$_4$" means the ratio of the amount of $\alpha'$-Si$_3$N$_4$ to the total amount of $\alpha'$-Si$_3$N$_4$ and $\beta'$-Si$_3$N$_4$ which is assumed to be 1. In Table 1, the outer part denotes a surface layer of the sintered body which is 300 μm thick, and the inner part denotes the part which is enclosed by the outer part. In Table 1, x represents the value of x in the formula $Y_x(Si,Al)_{12}(O,N)_{16}$, and z represents the value of z in the formula $Si_{6-z}Al_zO_zN_{8-z}$.

It is noted from Table 1 that the sintered bodies in the examples are higher in four-point bending strength by 10–20 kg/mm$^2$, than those in the comparative examples. They are apparently superior in strength and toughness.

TABLE 1

| Example No. (Comparative Example No.) | Ave. dia. of crystal grains (μm) | | | Ratio of $\alpha'$-Si$_3$N$_4$ | | x | | y | | 4-point bending strength at room temperature (kg/mm$^2$) | $K_{IC}$ (MPa m$^{\frac{1}{2}}$) |
|---|---|---|---|---|---|---|---|---|---|---|---|
| | $\alpha'$-Si$_3$N$_4$ | $\beta'$-Si$_3$N$_4$ (major axis) | $\beta'$-Si$_3$N$_4$ (minor axis) | Outer part | Inner part | Outer part | Inner part | Outer part | Inner part | | |
| 1 | 1.0 | 2.9 | 0.9 | 0.37 | 0.36 | 0.23 | 0.10 | 0.8 | 0.8 | 87 | 7.3 |
| 2 | 1.0 | 2.8 | 0.8 | 0.30 | 0.30 | 0.21 | 0.10 | 0.8 | 0.8 | 85 | 7.2 |
| 3 | 0.9 | 2.6 | 0.7 | 0.25 | 0.24 | 0.20 | 0.11 | 0.9 | 0.8 | 86 | 7.2 |
| 4 | 0.8 | 2.6 | 0.8 | 0.23 | 0.23 | 0.19 | 0.09 | 0.8 | 0.8 | 87 | 7.3 |
| 5 | 0.6 | 2.3 | 0.6 | 0.22 | 0.22 | 0.21 | 0.10 | 0.8 | 0.8 | 92 | 7.3 |
| 6 | 0.6 | 2.1 | 0.4 | 0.21 | 0.20 | 0.20 | 0.09 | 0.9 | 0.9 | 94 | 7.5 |
| 7 | 0.6 | 2.0 | 0.4 | 0.10 | 0.10 | 0.19 | 0.10 | 0.8 | 0.8 | 95 | 7.5 |
| (1) | 1.0 | 2.8 | 0.9 | 0.36 | 0.36 | 0.22 | 0.22 | 0.8 | 0.8 | 79 | 7.1 |
| (2) | 0.9 | 2.6 | 0.8 | 0.25 | 0.25 | 0.19 | 0.19 | 0.9 | 0.9 | 77 | 7.1 |
| (3) | 0.6 | 2.0 | 0.4 | 0.10 | 0.10 | 0.17 | 0.17 | 0.8 | 0.8 | 78 | 7.2 |

What is claimed is:

1. A sintered body of silicon nitride which consists essentially of $\alpha'$-Si$_3$N$_4$ represented by the formula $Y_x(Si,Al)_{12}(O,N)_{16}$ and $\beta'$-Si$_3$N$_4$ represented by the formula $Si_{6-z}Al_zO_zN_{8-z}$ (where $0 < z \leq 4.2$), the ratio between the amount of $\alpha'$-Si$_3$N$_4$ and the amount of $\beta'$-Si$_3$N$_4$ in the outer part of the sintered body being substantially equal to that in the inner part of the same, and the value of x of said Y being in the range of $0 < x < 0.3$, with the value of x for $\alpha'$-$Si_3N_4$ present in the outer part of the sintered body being greater than that for $\alpha'$-$Si_3N_4$ present in the inner part of the sintered body.

2. A sintered body of silicon nitride as claimed in claim 1, wherein the value of x in the formula for $\alpha'$-$Si_3N_4$ in the outer part is greater by more than 0.05 than that in the formula for $\alpha'$-$Si_3N_4$ in the inner part.

3. A sintered body of silicon nitride as claimed in claim 1 wherein said outer part is formed as a surface layer.

4. A sintered body of silicon nitride as claimed in claim 3, wherein the surface layer has a thickness in the range of 200 to 500 $\mu$m.

5. A sintered body of silicon nitride as claimed in claim 1, which is provided with a surface layer and one or more intermediate layers between the surface layer and the inner part such that the value of x for $\alpha'$-$Si_3N_4$ in the surface layer is greater than that for $\alpha'$-$Si_3N_4$ in the inner part and the value of x for $\alpha'$-$Si_3N_4$ in the intermediate layers is intermediate between said two values of x.

6. A sintered body of silicon nitride as claimed in claim 5, wherein the surface layer and intermediate layer have a total thickness in the range of 200 to 500 $\mu$m.

7. A sintered body of silicon nitride as claimed in claim 1, wherein the value of x for $\alpha'$-$Si_3N_4$ in the sintered body continuously increases across the thickness from the inside toward the surface.

8. A sintered body of silicon nitride as claimed in claim 1, wherein the value of z in the formula $Si_{6-z}Al_zO_zN_{8-z}$ for $\beta'$-$Si_3N_4$ is in the range of $0 < z \leq 1.0$.

9. A sintered body of silicon nitride as claimed in claim 1, wherein the ratio between the amount of $\alpha'$-$Si_3N_4$ in the sintered body and the amount of $\beta'$-$Si_3N_4$ in the sintered body is in the range of 0.05:0.95 to 0.50:0.50.

10. A sintered body of silicon nitride as claimed in claim 9, wherein the ratio between the amount of $\alpha'$-$Si_3N_4$ in the sintered body and the amount of $\beta'$-$Si_3N_4$ in the sintered body is in the range of 0.07:0.93 to 0.35:0.65.

11. A sintered body of silicon nitride as claimed in claim 1, wherein the $\alpha'$-$Si_3N_4$ is composed of crystal grains whose average diameter is not larger than 2.0 $\mu$m and the $\beta'$-$Si_3N_4$ is composed of crystal grains whose average diameter is not larger than 5.0 $\mu$m in the major axis and not larger than 1.0 $\mu$m in the minor axis.

12. A sintered body of silicon nitride as claimed in claim 11, wherein the $\alpha'$-$Si_3N_4$ is composed of crystal grains whose average diameter is not larger than 1.0 $\mu$m and the $\beta'$-$Si_3N_4$ is composed of crystal grains whose average diameter is not larger than 2.5 $\mu$m in the major axis and not larger than 0.5 $\mu$m in the minor axis.

13. A sintered body of silicon nitride as claimed in claim 1, wherein the $\beta'$-$Si_3N_4$ is composed of crystal grains whose average diameter in the major axis is greater than twice that in the minor axis.

14. A sintered body of silicon nitride as claimed in claim 1, which further consists essentially of at least one heat-resistant substance selected from the group consisting of oxides, nitrides, carbides, silicides, borides, and sulfides.

* * * * *